Patented Oct. 16, 1928.

1,688,259

UNITED STATES PATENT OFFICE.

FRANZ ZERNIK, OF WURZBURG, GERMANY.

LIGHT FILTER.

No Drawing. Application filed April 27, 1925, Serial No. 26,292, and in Germany May 8, 1924.

It has been found that the hydroxyquinoline sulfonic acids and their derivatives are excellent, practically colorless light-filters for ultra-violet rays of natural and artificial sources of light, as they even absorb the whole of the ultra-violet spectrum very effectively.

The light-filters made in accordance with the invention, containing hydroxyquinoline sulfonic acids or their derivatives, and if desired other protective means against light or other substances favourable to their application, constitute an advantageous combination of various excellent qualities. For example, with the highest absorptive capacity they combine the property that their solutions are extremely stable, so that they will not become darker. Moreover they have the advantage of also acting in an acid solution. When evaporating their solutions, no colored stains will be produced on paper, tissues or the like, as compared with many well known substances used for light filters. Further the light-filters according to the invention show no signs of fluorescence in the day-light. This is of importance for practical use in many cases, e. g. for employing the bodies in question as ingredients of eye-salves or for administering certain fluids by drops into the eye, as the means causing fluorescence will pain the patient by causing a twitching of the eye. Of the derivatives of the hydroxy-quinoline-sulphonic acid and its salts and compounds those products primarily come into consideration in which an alkyl or aryl group has been substituted for the hydrogen of the hydroxyl.

Good results have been obtained by the utilization of—

8-methoxy-quinoline-5-sulfonic acid fusing at 302° C. with decomposition:

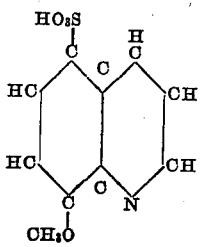

the corresponding ethoxy-compound fusing at 283° C. with decomposition.

Sodium salt of the 6-methoxy-quinoline-5-sulfonic acid (fusion point of the free acid being 345° C. with decomposition):

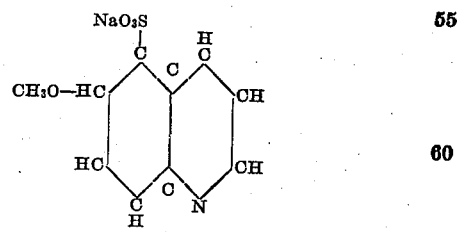

The application of hydroxyquinoline sulfonic acids and their derivatives as light-filters may be adapted to the object in view; e. g. they may be applied in the form of a solid or a liquid, as an ointment, a paste or the like. If desired the light-filters may also contain several light-protective means of the above-mentioned kind; or such means according to the invention may be used in combination with other protective means against light. Finally the light-protective means may also be employed in connexion with substances capable of producing other favourable effects. Solutions containing hydroxyquinoline sulfonic acid or its derivatives and at the same time such compounds as for example suprarenine, when dropped into the eyes, protect them exceedingly well against the deleterious effects of dazzling light, for instance when film pictures for cinema-productions are taken in artificial light, and the like.

Claims:

1. Light filters containing hydroxy-quinoline sulphonic acids as efficacious substances.

2. Light filters containing derivatives of the hydroxy-quinoline sulphonic acids as efficacious substances.

3. Light filters containing as efficacious substances derivatives of the hydroxy-quinoline sulphonic acids in which a hydro-carbon radical has been substituted for the hydrogen of the hydroxyl.

4. Light filters containing as efficacious substances derivatives of the hydroxy-quinoline sulphonic acids in which an aliphatic radical has been substituted for the hydrogen of the hydroxyl.

5. Light filters containing as efficacious substances derivatives of the salts of the hydroxy-quinoline sulphonic acids in which an aliphatic radical has been substituted for the hydrogen of the hydroxyl.

6. Light filters containing as efficacious substances derivatives of the homologous compounds of the hydroxy-quinoline sulphonic acids in which an aliphatic radical has been substituted for the hydrogen of the hydroxyl.

7. Light filters containing as efficacious substances 8-aliphatic radical oxy-quinoline-5-sulphonic acid.

In testimony whereof I affix my signature.

Dr. FRANZ ZERNIK.